United States Patent Office 3,412,129
Patented Nov. 19, 1968

3,412,129
ALKALI METAL SULFATE SUBSTITUTED ORGANOSILOXANES CONTAINING INTERNAL SULFATE GROUPS AND PROCESS THEREFOR
Norman G. Holdstock, Scotia, N.Y., assignor to General Electric Company, a corporation of New York
No Drawing. Filed Dec. 23, 1965, Ser. No. 516,099
12 Claims. (Cl. 260—448.2)

This invention relates to a method for producing organosilicon compositions having alkali metal sulfate substituents and to a new product produced by the process which contains, in addition to alkali metal sulfate substituents, sulfate groups within the organosilicon chain.

More particularly, this invention relates to a new organosilicon polymer containing sulfate groups in the chain which has the formula:

(1) 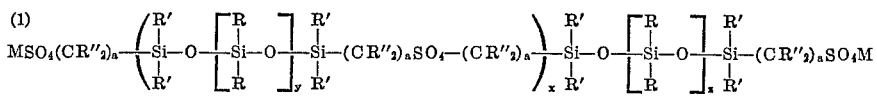

where M is selected from the class consisting of sodium and potassium; R is an alkyl radical of from 1 to 3 carbon atoms; R′ is a monovalent hydrocarbon radical, free of aliphatic unsaturation, having no more than 7 carbon atoms; and R″ is the same as R′, and, additionally, hydrogen; $a$ is an integral number of from 3 to 8, inclusive; $x$ is from 1 to 10; $y$ is from 0 to 150; and $z$ is from 0 to 150. Preferably $y$ and $z$ are from 0 to 50. It should be recognized that each R, each R′, and each R″ within a particular polymer of Formula 1 need not be the same nor need each $a$, $x$, $y$, nor $z$ be the same within any particular polymer.

Additionally, this invention relates to a method for forming, not only the polymer just described, but additionally, the polymer of Formula 1 where $x$ is 0, that is, organopolysiloxanes having alkali metal sulfate substituents as chain terminals, with no internal sulfate groups. This method involves the reaction of a heterocyclic silaoxacycloalkane having the formula:

(2) 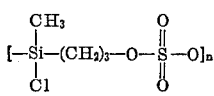

where R′, R″, and $a$ are as previously defined, with from 0.5 to 1.1 moles of a material selected from the class consisting of concentrated sulfuric acid and oleum. Among the monovalent hydrocarbon radicals represented by R′ are alkyl radicals, e.g., methyl, ethyl, propyl, isopropyl, hexyl, heptyl, etc.; aryl radicals, e.g., phenyl, tolyl, etc.; aralkyl radicals, e.g., benzyl; and cycloalkyl radicals, e.g., cyclopentyl, cyclohexyl, cycloheptyl, etc. These same radicals are exemplary of those represented by R″ which can, as previously mentioned, also be hydrogen. Further, the novel process of the present invention can include among the reactants a diorganopolysiloxane material, in addition to the sulfuric acid and the previously described silaoxacycloalkane of Formula 2. These diorganopolysiloxane materials can be either straight chain polymers, or cyclic materials, with recurring units of the formula:

(3) 

where R is as previously defined. The preferred diorganopolysiloxane materials are the cyclics, such as octamethylcyclotetrasiloxane, octaethylcyclotetrasiloxane, 1,3,5,7-tetramethyl-1,3,5,7-tetraethylcyclotetrasiloxane, etc.

With respect to the new polymeric composition of Formula 1, many organosilicon polymers containing sulfur within the polymeric chain have been described. For example, in U.S. Patent 3,109,012 Rossmy et al. a material is shown with the structure:

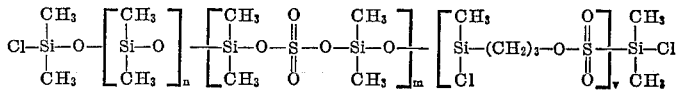

Similarly, in U.S. Patent 3,161,611, Rossmy, a material with recurring units of the formula:

is shown. In both of the materials shown, the sulfate group is connected to at least one of the silicon atoms between which it is situated in the chain by an —Si—O—S— linkage, though it is joined to the other silicon atom by an alkylene bridge. Further, in the formula shown from U.S. Patent 3,109,012, the polymer also contains sulfate groups linked to both adjacent silicon atoms in the chain by —Si—O—S— linkages. The polymer described according to Formula 1 where $x$ is from 1 to 10, is the first showing sulfate groups within an organosilicon polymer chain joined to both of the adjacent silicon atoms in the chain, in every case, through alkylene bridges. This material is useful, for example, as a surfactant in cosmetic formulations.

The formation of polymeric organosilicon materials from the heterocyclic compositions of Formula 2 with the aid of an acid, such as sulfuric acid, has been taught, for example, in U.S. Patent 2,983,744 Knoth, Jr. Knoth teaches that the heterocyclic silaoxacycloalkanes can be hydrolyzed to oxasiladiols and that when these oxasiladiols are equilibrated with an octahydrocarbocyclotetrasiloxane, in the presence of an acid such as sulfuric acid, a polyoxasiladiol is formed having the formula:

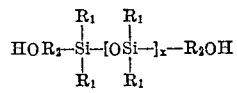

where R₁ is a monovalent hydrocarbon radical and R₂ is a divalent hydrocarbon radical, free of aliphatic unsaturation. Completely unexpected, particularly in view of this teaching, I have found that when I treat the silaoxacycloalkane of Formula 2 with sulfuric acid, a material of Formula 1 is formed after neutralizing with an alkali metal base. Depending upon the amount of sulfuric acid utilized, I can form such a material where $x$ is 0, or, on the other hand, can form such a material where $x$ is from 1 to 10. I will now describe this process in greater detail.

To carry out the process of the present invention, the silaoxacycloalkane of Formula 2, which can be prepared, for example, by the method described in the aforementioned patent of Knoth, Jr. or as described in Patent 3,083,219 Anderson, is reacted with sulfuric acid at any temperature from about 0° C. to less than about 100° C. Preferably the reaction is carried out between room temperature and 50° C.; the higher the reaction temperature, the more difficult the reaction is to control. The sulfuric acid which is utilized can be concentrated (96%) or oleum, such as 100% oleum, since water is to be kept at a minimum in order to avoid hydrolysis and formation of —C—O—C— linkages. When it is desired to form the material of Formula 1 where $x$ is 0, the sulfuric acid should be employed in an approximately stoichiometric ratio with the silaoxacycloalkane, that is about 1 mole of sulfuric acid for each mole of the silaoxacycloalkane employed. The sulfuric acid can be employed in a 10% excess. When the polymeric materials containing sulfate groups within the organosilicon chain are desired, that is the material of Formula 1 where $x$ is from 1 to 10, then a lower ratio of sulfuric acid should be utilized. For example, to form the polymeric material where $x$ is from 1 to 10, there should be from about 0.5 mole to 1 mole of sulfuric acid for each mole of the silaoxacycloalkane utilized. While the order of addition is not critical, it is preferred to add the sulfuric acid to the heterocyclic material, particularly when it is desired to form the polymeric material. The sulfuric acid can be added as quickly as desired, so long as the desired temperature is maintained in the reaction medium. The reaction is instantaneous so that it is not necessary to allow a residence time following completion of the addition. In fact, it is desired that the materials be neutralized in a period of no more than 8 to 10 hours following the addition, or the product undesirably degrades due to sulfuric acid attack of the organic groups attached to the silicon atom. The material formed by the reaction of the sulfuric acid with the silaoxacycloalkane can be neutralized with any of a wide variety of alkali metal bases. Among these materials are sodium carbonate, sodium bicarbonate, potassium carbonate, potassium bicarbonate, etc. If careful control is maintained to assure that a stoichiometric amount of base is employed, alkali metal hydroxides such as sodium hydroxide and potassium hydroxide can be employed for the neutralization. With the other alkali metal bases, the amount employed is not critical, but there should be at least a 10% excess, based upon the stoichiometric ratio with the amount of sulfuric acid employed. The neutralization is performed in aqueous medium and any temperature from about room temperature to 100° C. can be utilized. Preferably, the neutralization is carried out at room temperature for convenience.

Following neutralization of the sulfuric acid-silaoxacycloalkane reaction product with the alkali metal base, when $y$ and $z$ are 0 in the product of Formula 1, the water is evaporated, under vacuum, to a maximum temperature of about 60° C. The resulting product is a solid containing both the just described product of Formula 1 and an alkali metal sulfate. The organosiloxane material is then obtained from the mixture by solvent extraction. The solvent utilized is an oxyhydrocarbon selected from the class consisting of ketones, alcohols, ethers, and mixtures of ketones, alcohols, and ethers.

As previously mentioned, the method of the present invention also contemplates a reaction between a diorganopolysiloxane material and the silaoxacycloalkane and sulfuric acid previously described. The product is a polymer of Formula 1 where $y$ and $z$ are between 1 and 150. The conditions of the reaction are the same as described for the method without the diorganopolysiloxane material, except that (1) the mixture should be kept in contact with the acid for a minimum of 12 hours to accomplish equilibration, and (2) product recovery is accomplished differently following neutralization with the alkali metal base. Following neutralization, the product is, as with the material containing no additional polydiorganosiloxane, treated with a solvent. The solvent utilized is a mixture of an aryl hydrocarbon and an oxyhydrocarbon in a ratio of from 3:2 to 2:3. Among the aryl hydrocarbons which can be utilized are toluene, benzene, xylene, etc. The oxyhydrocarbon is preferably a ketone, and more preferably acetone, but ethers and alcohols can also be utilized. The solution of the sulfur-containing organosilicon material which holds the salts resulting from the neutralization process is stirred for about 15 minutes and the excess alkali metal base and the non-organosilicon alkali metal sulfate reaction product are then filtered off. The remaining solvents and water are removed from the product by a vacuum stripping to a pot temperature of about 130° C., maximum. The result is the purified material of Formula 1 where $x$ is from 0 to 10 and $y$ and $z$ are from 1 to 150.

To enable those skilled in the art to practice the present invention, the following examples are given. These examples should be considered as illustrative only, and not as limiting in any way the full scope of the present invention as covered in the appended claims. All parts are by weight.

EXAMPLE 1

Into a reaction vessel fitted with a stirrer and a condenser was placed a quantity of 130 parts of 2,2-dimethyl-1-oxa-2-silacyclohexane, having the formula:

(4) 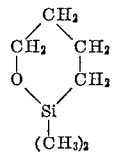

equivalent to Formula 2 where each $R'$ is methyl, each $R''$ is hydrogen, and $a$ is 4. The reaction vessel was cooled, the stirrer started, and a quantity of 110 parts of 96% sulfuric acid added slowly to the silaoxacycloalkane over a period of about 45 minutes. The mixture was stirred for about 3 hours and 500 parts of a 15% solution of sodium carbonate was added slowly and stirred for about 30 minutes. The water was evaporated from the reaction mixture under vacuum to a pot temperature of 50° C., leaving a mixture of sodium sulfate and the sodium salt of the sulfate-substituted organosilicon material. The product was extracted 5 times with 100 parts of hot alcohol and hot acetone and then fractionally precipitated to yield 75% of a material having the formula:

(5) 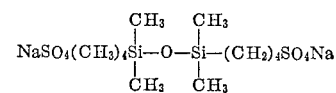

the remainder being a mixture of materials of the formula:

(6) 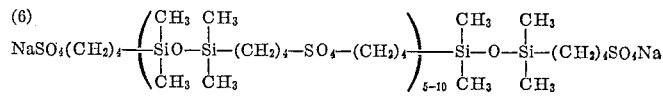

The polymer of Formula 5 is equivalent to the generic polymer described in Formula 1 where M is sodium, $a$ is 4, $R'$ is methyl, $R''$ is hydrogen, and $x$ and $z$ are 0, while the material of Formula 6 is equivalent to the generic polymer of Formula 1 where M, $R'$, $R''$, $a$ and $z$ are as defined for the material of Formula 5, $x$ is from 5 to 10, and $y$ is 0. An infrared analysis of these materials showed no hydroxyl group in the product, indicating complete conversion to the material of either Formula 5 or Formula 6. The material of Formula 5 was a dry, powdery, amorphous solid, completely water soluble, while the materials of Formula 6 were wax-like solids, the larger the value of $x$, the softer the material.

EXAMPLE 2

Into a reaction vessel fitted with a stirrer, condenser, and thermometer were placed 880 parts of octamethylcyclotetrasiloxane and 156 parts of 2,2-dimethyl-1-oxa-2-silacyclohexane, the silaoxacycloalkane of Formula 4. While keeping the temperature of the mixture below 50° C., a quantity of 130 parts of 96% sulfuric acid was added to the mixture, with agitation. The reaction mixture was stirred at room temperature for about 15 hours to obtain equilibration with the dimethylpolysiloxane material. The product was neutralized with a 25% excess of sodium carbonate and 10 parts of water, and stirring was continued until a pH value of about 7.5–8.0 was obtained. The resulting product was very thick, and a mixture of toluene and acetone, in a ratio of 3:2, containing a small amount of water to dissolve the sulfate solids, was added. The excess sodium carbonate and the sodium sulfate formed during the neutralization were filtered from the mixture and the solvents and water were removed by vacuum stripping to a pot temperature of about 130° C. The resulting product was soft and grease-like, and only partially soluble in organic solvents such as toluene, benzene, and acetone. It was dispersible in water, but not soluble; however, if water was added slowly to the grease, a water-in-oil emulsion was formed. The material has the approximate average formula:

(7)
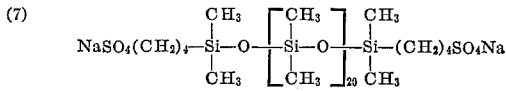

which corresponds to generic Formula 1 where M is sodium, R is methyl, R' is methyl, R'' is hydrogen, $a$ is 4, $z$ is 20, and $x$ is 0.

EXAMPLE 3

Using the same procedures and the same materials as employed in Example 2, a material having the approximate average formula:

(8)
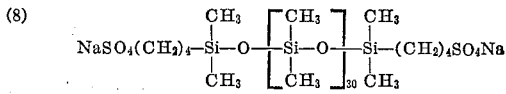

is formed, using 666 parts of octamethylcyclotetrasiloxane, 78 parts of the silaoxacycloalkane of Example 2, and 66 parts of 96% sulfuric acid. The material was soft and grease-like.

EXAMPLE 4

A material having the approximate average formula:

(9)
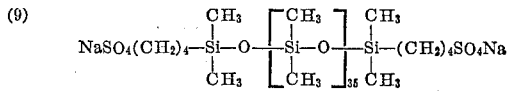

was formed using the same materials and conditions as in Example 2, but employing 259 parts of octamethylcyclotetrasiloxane, 26 parts of the silaoxacycloalkane, and 22 parts of 96% sulfuric acid. This material was also soft and grease-like.

EXAMPLE 5

Employing 296 parts of octamethylcyclotetrasiloxane, 26 parts of 2,2-dimethyl-1-oxa-2-silacyclohexane, and 22 parts of 96% sulfuric acid, under the same conditions as in Example 2, a material having the approximate average formula:

(10)
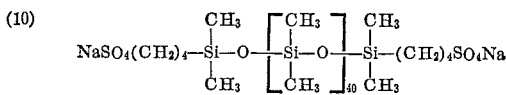

was prepared. This material was semi-fluid, rather than grease-like.

EXAMPLE 6

Using 725 parts of octamethylcyclotetrasiloxane, 26 parts of 2,2-dimethyl-1-oxa-2-silacyclohexane, and 22 parts of 96% sulfuric acid, with the same procedure as in Example 2, a polymer was prepared having the approximate average formula:

(11)
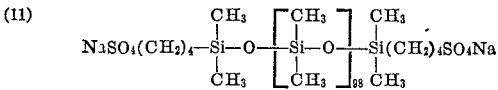

This material corresponds to Formula 1 where M is sodium, R is methyl, R' is methyl, R'' is hydrogen, $a$ is 4, $z$ is 98, and $x$ is 0. This material was more fluid than that described by Formula 10 in Example 5.

EXAMPLE 7

Into a stirred reaction vessel were placed 1760 parts of 1,3,5,7 - tetramethyl - 1,3,5,7-tetraethylcyclotetrasiloxane and 248 parts of 2,5-dimethyl-2-phenyl-1-oxa-2-silacyclononane. While maintaining the pot temperature below 60° C., a quantity of 65 parts of 100% oleum is added. The mixture is stirred for about 30 minutes. 37 parts of potassium bicarbonate in a 20% aqueous solution are added, and this mixture stirred for about 12 hours. A quantity of 3,000 parts of a mixture of benzene and methylethylketone in a ratio of 45:55 is added and the new mixture is stirred for about 1 hour. The excess potassium bicarbonate and the potassium sulfate formed during the neutralization are filtered from the solution and the solution is vacuum stripped to a pot temperature of about 120° C., leaving behind a grease-like material with the approximate average formula:

(12)
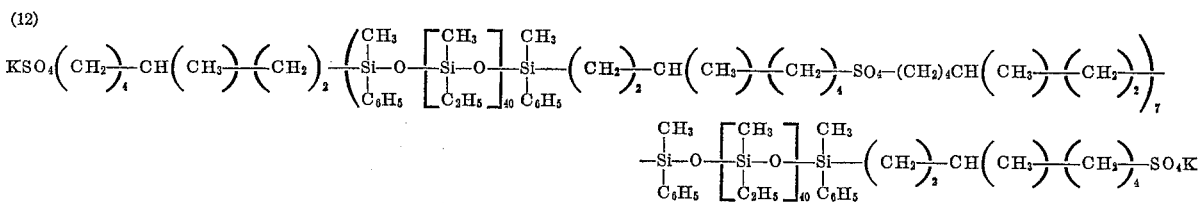

which corresponds to Formula 1 where M is potassium, R is methyl and ethyl, R' is methyl and phenyl, R'' is methyl and hydrogen, $a$ is 7, $x$ is 7, $y$ is 40, and $z$ is 40.

Each of the materials formed according to the process of the present invention are valuable as cosmetic surfactants and as surfactants in general, as has been shown in the prior art. Additionally, the materials of Formula 1, where $x$ is at least 1, are valuable as self-emulsifying organosilicon materials as, for example, when it is desired to deposit a thin film of lubricating organopolysiloxane material. Thus, for example, the material of Formula 12 can be emulsified with about an equal quantity of water and poured into an apparatus containing two closely spaced surfaces. If the apparatus is then heated to a moderate temperature of about 150° C., the water is evaporated and the sulfate linkages are broken yielding a stable diorganopolysiloxane material which effectively lubricates the two surfaces.

What I claim as new and desire to secure by Letters Patent of the United States is:

1. An organosilicon material having the formula:

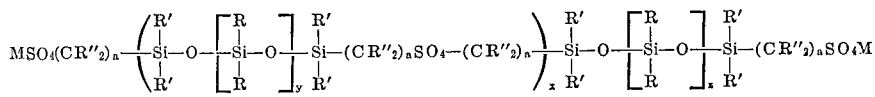

where M is selected from the class consisting of sodium and potassium; R is an alkyl radical of from 1 to 3 carbon atoms; R' is a monovalent hydrocarbon radical free of aliphatic unsaturation having no more than 7 carbon atoms; R'' is the same as R', and, additionally, hydrogen; $a$ is an integral number of from 3 to 8, inclusive; $x$ is from 1 to 10; $y$ is from 0 to 150; and $z$ is from 0 to 150.

2. The composition of claim 1 wherein $y$ is from 0 to 50 and $z$ is from 0 to 50.

3. The composition of claim 1 having the approximate average formula:

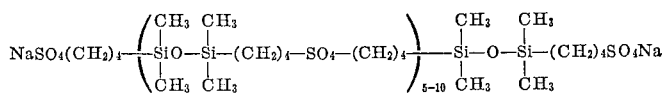

4. The composition of claim 1 having the approximate average formula:

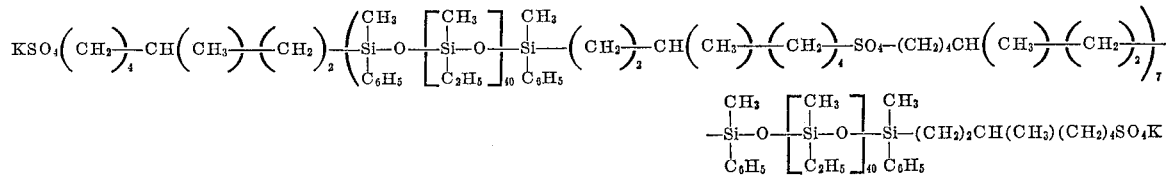

5. A method for forming an organosilicon material having the formula:

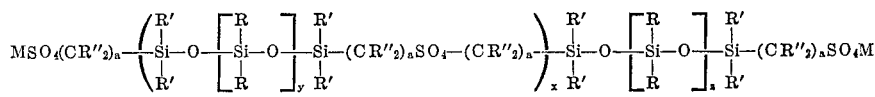

where M is selected from the class consisting of sodium and potassium; R is an alkyl radical of from 1 to 3 carbon atoms; R' is a monovalent hydrocarbon radical, free of aliphatic unsaturation, having no more than 7 carbon atoms; R'' is the same as R', and, additionally, hydrogen; $a$ is an integral number of from 3 to 8, inclusive; $x$ is from 1 to 10; $y$ is from 0 to 150; and $z$ is from 0 to 150; comprising reacting a silaoxacycloalkane of the formula:

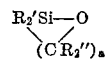

where R', R'', and $a$ are as previously defined with from 0.5 to 1.1 mole per mole of the silaoxacycloalkane of a material selected from the class consisting of concentrated sulfuric acid and oleum.

6. The method of claim 5 wherein 2,2-dimethyl-1-oxa-2-silacyclohexane is reacted with concentrated sulfuric acid.

7. The method of claim 5 wherein the material selected from the class consisting of concentrated sulfuric acid and oleum is employed in the range of from 1.0 to 1.1 mole per mole of the silaoxacycloalkane.

8. The method of claim 5 wherein the material selected from the class consisting of concentrated sulfuric acid and oleum is used in the range of from 0.5 to 1.0 mole per mole of the silaoxacycloalkane.

9. The method of claim 5 wherein a diorganopolysiloxane material, having recurring units of the formula:

where R is an alkyl radical of from 1 to 3 carbon atoms, is reacted with the silaoxacycloalkane and the material selected from the class consisting of concentrated sulfuric acid and oleum.

10. The method of claim 9 wherein octamethylcyclotetrasiloxane, 2,2-dimethyl-1-oxa-2-silacyclohexane, and concentrated sulfuric acid are reacted.

11. The method of claim 9 wherein the material selected from the class consisting of concentrated sulfuric acid and oleum is employed in the range of from 1.0 to 1.1 mole per mole of the silaoxacycloalkane.

12. The method of claim 9 wherein the material selected from the class consisting of concentrated sulfuric acid and oleum is used in the range of from 0.5 to 1.0 mole per mole of the silaoxacycloalkane.

References Cited

UNITED STATES PATENTS

| | | | |
|---|---|---|---|
| 2,968,643 | 1/1961 | Bailey | 260—448.2 X |
| 2,983,744 | 5/1961 | Knoth. | |
| 3,109,012 | 10/1963 | Rossmy et al. | |
| 3,161,611 | 12/1964 | Rossmy. | |
| 3,187,033 | 6/1965 | Nitzsche et al. | 260—448.2 |
| 3,215,643 | 11/1965 | Pail | 260—448.2 X |
| 3,328,449 | 6/1967 | Haluska | 260—448.2 |

TOBIAS E. LEVOW, *Primary Examiner.*

P. F. SHAVER, *Assistant Examiner.*